US009869229B2

(12) United States Patent
Novacek et al.

(10) Patent No.: US 9,869,229 B2
(45) Date of Patent: Jan. 16, 2018

(54) HORIZONTAL MUFFLER MOUNTING ASSEMBLY FOR AN OFF-ROAD VEHICLE

(71) Applicant: CNH Industrial America LLC, New Holland, PA (US)

(72) Inventors: Jason Keith Novacek, West Fargo, ND (US); John Thomas Rasset, Barnesville, MN (US); Christopher Hintz, Mapleton, ND (US); Jonathan Weigel, Fargo, ND (US); Nathaniel James Keller, Harwood, ND (US); James Patrick Boeshans, Hawley, MN (US); Jason Weyer, Fargo, ND (US); Nathan Carlson, West Fargo, ND (US); David Larry Tveito, West Fargo, ND (US); Parker Dan Snow, Kensal, ND (US); Chad Bautz, Fargo, ND (US); Jacob Eugene Fink, Hillsboro, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/826,034

(22) Filed: Aug. 13, 2015

(65) Prior Publication Data
US 2016/0047289 A1    Feb. 18, 2016

Related U.S. Application Data

(60) Provisional application No. 62/037,531, filed on Aug. 14, 2014.

(51) Int. Cl.
*F01N 13/18* (2010.01)
*B60K 13/04* (2006.01)

(52) U.S. Cl.
CPC .......... *F01N 13/1805* (2013.01); *B60K 13/04* (2013.01); *B60Y 2200/20* (2013.01); *B60Y 2200/22* (2013.01); *B60Y 2306/09* (2013.01)

(58) Field of Classification Search
CPC .... B60K 13/04; B60K 15/063; B60K 15/067; F01N 13/1805; F01N 13/1822; F01N 13/1855; F01N 2590/08
(Continued)

(56) References Cited

U.S. PATENT DOCUMENTS 2,074,523 A * 3/1937 Thwaits .................... B60P 3/22
                                                    220/DIG. 24
2,081,546 A * 5/1937 MacPherson ....... F01N 13/1822
                                                    180/296
(Continued)

FOREIGN PATENT DOCUMENTS

| EP | 0807749 | 11/1997 |
| EP | 1375227 | 1/2004 |
| EP | 1794019 | 6/2007 |

OTHER PUBLICATIONS

European Search Report for European Application No. 15180805.2 dated Dec. 18, 2015 (10 pages).

*Primary Examiner* — James A Shriver, II
*Assistant Examiner* — Brian Cassidy
(74) *Attorney, Agent, or Firm* — Richard K. DeMille; Rebecca L. Henkel

(57) ABSTRACT

A system includes a mounting assembly for a muffler of an off-road vehicle including a first mounting pad rotatably coupled to a first support. The first mounting pad is configured to rotate in a first direction and in a second direction, opposite the first direction, about a first rotation axis. The mounting assembly also includes a second mounting pad rotatably coupled to a second support. The second mounting pad is configured to rotate in the first direction and in the
(Continued)

second direction about a second rotation axis. Moreover, the first and second mounting pads are laterally offset from one another relative to a longitudinal axis of the muffler, the first and second mounting pads are configured to support the muffler, and the first and second mounting pads are configured to independently rotate relative to the respective supports about the respective rotation axes.

11 Claims, 7 Drawing Sheets

(58) Field of Classification Search
USPC ............ 180/309; 248/74.3, 67.7; 29/525.02; 60/322
See application file for complete search history.

(56) References Cited

U.S. PATENT DOCUMENTS

| | | | | |
|---|---|---|---|---|
| 3,944,265 | A * | 3/1976 | Hiemstra | F01N 13/1805 24/279 |
| 4,085,816 | A * | 4/1978 | Amagai | F01N 13/14 180/89.2 |
| 5,880,413 | A * | 3/1999 | Wagner | B60K 13/04 181/211 |
| 6,042,071 | A * | 3/2000 | Watanabe | B60K 15/07 180/69.5 |
| 6,141,958 | A * | 11/2000 | Voss | F01N 3/02 138/177 |
| 6,438,949 | B1 * | 8/2002 | Nozaki | B60K 13/04 123/184.21 |
| 6,481,673 | B1 * | 11/2002 | Roe | B60K 13/04 248/300 |
| 6,637,706 | B2 * | 10/2003 | Kim | B60K 15/067 248/154 |
| 6,896,318 | B2 * | 5/2005 | Marrs | B62D 33/00 280/833 |
| 6,996,976 | B2 * | 2/2006 | Rumminger | F01N 13/008 204/421 |
| 7,501,005 | B2 * | 3/2009 | Thaler | B01D 46/001 285/407 |
| 7,678,168 | B2 * | 3/2010 | Connelly | F16L 55/035 180/309 |
| 7,780,198 | B2 * | 8/2010 | Taylor | B60K 15/067 280/164.1 |
| 8,141,535 | B2 * | 3/2012 | Olsen | F01N 13/1805 123/195 A |
| 8,418,448 | B2 * | 4/2013 | Kamata | B60K 5/1208 60/299 |
| 8,701,387 | B2 * | 4/2014 | Saito | F01N 3/0211 422/177 |
| 8,943,813 | B2 * | 2/2015 | Kamei | E02F 9/0866 60/286 |
| 9,090,158 | B2 * | 7/2015 | Fowler | B60K 13/04 |
| 9,103,476 | B2 * | 8/2015 | Geese | F16L 21/065 |
| 9,145,052 | B2 * | 9/2015 | De Biasi | B60K 15/067 |
| 9,175,455 | B2 * | 11/2015 | Sakai | E02F 3/7631 |
| 9,238,988 | B2 * | 1/2016 | Spooner | F01N 13/00 |
| 2006/0006635 | A1 * | 1/2006 | Sonderegger | B60K 15/067 280/830 |
| 2008/0054128 | A1 * | 3/2008 | Ivarsson | B60K 13/04 248/74.3 |
| 2010/0031644 | A1 * | 2/2010 | Keane | B60K 13/04 60/295 |
| 2010/0186394 | A1 * | 7/2010 | Harrison | F01N 3/103 60/299 |
| 2010/0257702 | A1 * | 10/2010 | Fritskey | F16L 33/04 24/20 R |
| 2012/0012731 | A1 * | 1/2012 | Johnson | F01N 13/1822 248/638 |
| 2015/0075894 | A1 * | 3/2015 | Kamimae | E02F 9/0833 180/309 |
| 2015/0097364 | A1 * | 4/2015 | Moloney | B60K 15/07 280/834 |
| 2015/0217634 | A1 * | 8/2015 | Sawai | B60K 15/063 280/834 |
| 2015/0233089 | A1 * | 8/2015 | Kamimae | E02F 9/0866 180/309 |
| 2015/0315954 | A1 * | 11/2015 | Edemann | F01N 13/1805 285/420 |
| 2016/0046182 | A1 * | 2/2016 | Boeshans | F01N 3/103 180/309 |
| 2016/0076430 | A1 * | 3/2016 | Freeman | F01N 3/2066 60/301 |
| 2016/0082829 | A1 * | 3/2016 | Hummel | F16B 2/08 248/315 |

* cited by examiner

HORIZONTAL MUFFLER MOUNTING ASSEMBLY FOR AN OFF-ROAD VEHICLE

CROSS-REFERENCE TO RELATED APPLICATION

This application claims priority from and the benefit of U.S. Provisional Application Ser. No. 62/037,531, entitled "HORIZONTAL MUFFLER MOUNTING ASSEMBLY FOR AN OFF-ROAD VEHICLE," filed Aug. 14, 2014, which is hereby incorporated by reference in its entirety.

BACKGROUND

The invention relates generally to exhaust systems and, more particularly, to a horizontal muffler mounting assembly for an off-road vehicle.

Exhaust systems are used to guide exhaust gases away from a controlled combustion device, such as an engine. Exhaust systems may include components such as a cylinder head, an exhaust manifold, a turbocharger, a treatment system, and a muffler (e.g., silencer). In an exhaust system for an internal combustion engine, exhaust gases of each cylinder of the engine exit through the cylinder head. Thereafter, the exhaust manifold collects the exhaust gases from the cylinders into one or more conduits or pipes. In some exhaust systems, the flow of the exhaust gases may be directed from the conduits through the turbocharger. Accordingly, the exhaust gases may be used to drive a turbine of the turbocharger to induce rotation of an impeller, which compresses air used by the combustion device. The exhaust gases may be treated in the treatment system to reduce certain elements (e.g., NOx, particulates, etc.) in the exhaust gases. Then, exhaust gases flow through a muffler that directs the exhaust gases out of the exhaust system and reduces noise of the exhaust. Certain off-road vehicles, such as tractors, may include a muffler that extends vertically within a line of sight of a driver of the vehicle. As such, the muffler may at least partially obstruct the vision of the driver.

BRIEF DESCRIPTION

In one embodiment a mounting assembly for a muffler of an off-road vehicle includes a first mounting pad rotatably coupled to a first support. The first mounting pad is configured to rotate in a first direction and in a second direction, opposite the first direction, about a first rotation axis. The mounting assembly also includes a second mounting pad rotatably coupled to a second support. The second mounting pad is configured to rotate in the first direction and in the second direction about a second rotation axis. In certain embodiments, the first and second mounting pads are laterally offset from one another relative to a longitudinal axis of the muffler, the first and second mounting pads are configured to support the muffler, and the first and second mounting pads are configured to independently rotate relative to the respective supports about the respective rotation axes.

In another embodiment a mounting assembly for a muffler of an off-road vehicle includes a cradle configured to receive the muffler, and to couple to a frame of the off-road vehicle. The mounting assembly also includes a first mounting pad assembly coupled to the cradle. In certain embodiments, the first mounting pad assembly includes a first support mounted on a support surface of the cradle and a first body rotatably coupled to the first support. The first body is configured to rotate about a first rotation axis. The first mounting pad assembly also includes a first mounting pad coupled to the first body. The first mounting pad is configured to contact an outer surface of the muffler to support the muffler within the mounting assembly. In certain embodiments, the mounting assembly also includes a second mounting pad assembly coupled to the cradle and laterally offset from the first mounting pad assembly relative to a longitudinal axis of the muffler. The second mounting pad assembly includes a second support mounted on the support surface of the cradle and a second body rotatably coupled to the second support. The second body is configured to rotate about a second rotation axis. The second mounting pad assembly also includes a second mounting pad coupled to the second body. In certain embodiments, the second mounting pad is bent to contact the outer surface of the muffler at two points to support the muffler within the mounting assembly.

In another embodiment a method of mounting a muffler in a muffler mounting assembly of an off-road vehicle includes moving the muffler into contact with a first contact surface of a first mounting pad such that the first mounting pad rotates to establish at least one first point of contact between the first contact surface and an outer surface of the muffler. The method also includes moving the muffler to contact a second contact surface of a second mounting pad such that the second mounting pad rotates to establish at least one second point of contact between the second contact surface and the outer surface of the muffler. The method further includes moving the muffler to contact a third contact surface of the second mounting pad such that the second mounting pad rotates to establish at least one third point of contact between the third contact surface and the outer surface of the muffler.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure are directed toward a muffler mounting assembly configured to automatically adjust to conform to a shape of a muffler. In certain embodiments, the muffler mounting assembly includes a cradle having a first mounting pad and a second mounting pad configured to receive the muffler. The first mounting pad assembly may include a first mounting pad mounted on a rotatable first body. The first body is configured to rotate about a first rotation axis, thereby rotating and/or pivoting the first mounting pad. The second mounting pad assembly includes a second mounting pad mounted on a second body. The second mounting pad includes two contact surfaces angularly offset from one another via a bend. Moreover, the second body is configured to rotate about a second rotation axis, thereby rotating and/or pivoting the second mounting pad. Accordingly, each of the first and second mounting pads is independently rotatable about the respective axis to conform the shape of the mounting assembly to the shape of the muffler as the muffler is disposed within the muffler mounting assembly. The muffler mounting assembly also includes straps configured to secure the muffler to the first and second mounting pads. To this end, the muffler mounting assembly is configured to hold and support the muffler and to mount the muffler proximate to a fender of an agricultural vehicle.

Figure 1:
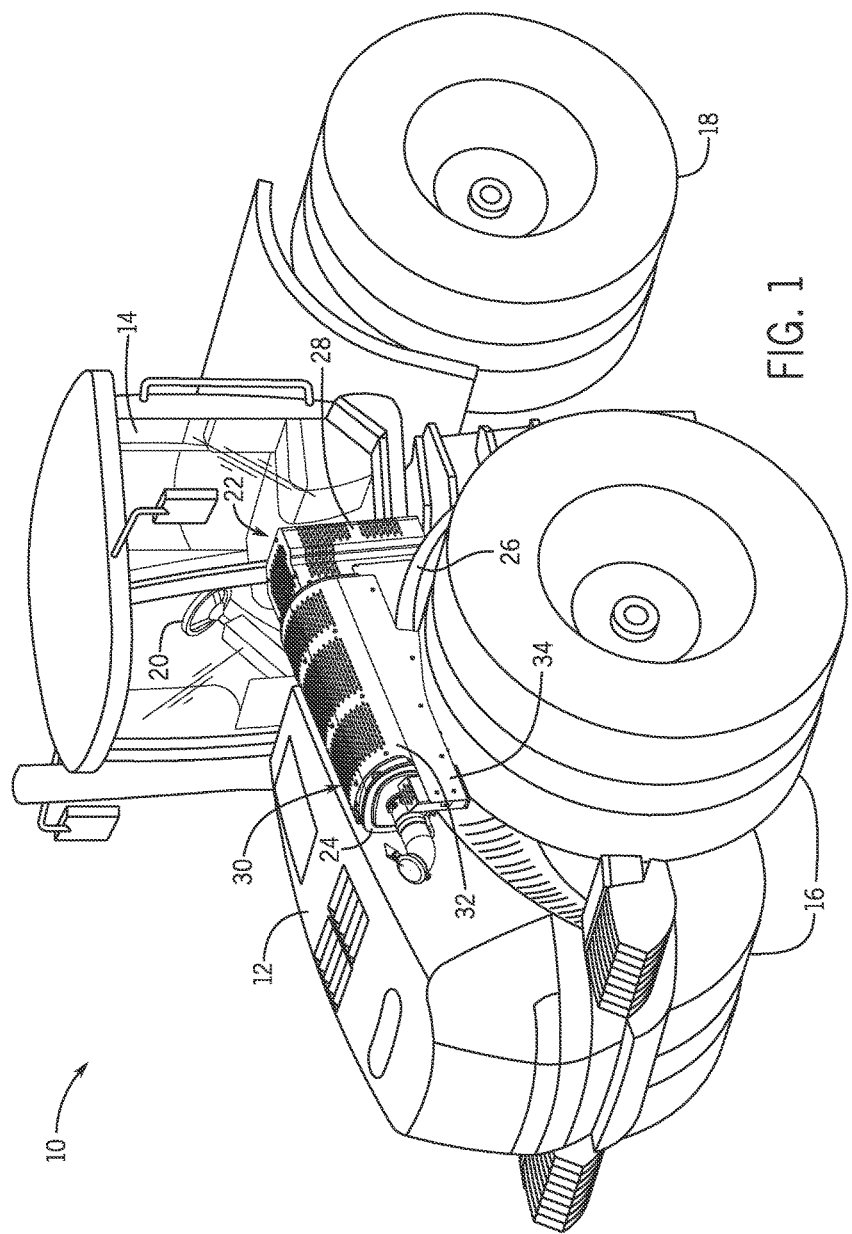
FIG. 1 is a perspective view of an embodiment of an off-road vehicle with a horizontal muffler.

FIG. 1 is a perspective view of an embodiment of an off-road vehicle (e.g., an agricultural vehicle) 10 with a substantially horizontal muffler. In certain embodiments, the off-road vehicle 10 may be any type of tractor, off-road vehicle, work vehicle, or any other suitable vehicle that utilizes an exhaust system. The off-road vehicle 10 has a body 12 that typically houses an engine, transmission, and power train. Furthermore, the off-road vehicle 10 has a cabin 14 where an operator may sit or stand to operate the off-road vehicle 10. The off-road vehicle 10 has two front wheels 16 and two rear wheels 18 that rotate to move the off-road vehicle 10. As illustrated, the off-road vehicle 10 is maneuvered using a steering wheel 20 configured to articulate the off-road vehicle 10 about an axis. In certain embodiments, the steering wheel 20 may turn the front wheels 16 (or the rear wheels 18) to control the steering of the off-road vehicle 10.

The off-road vehicle 10 includes an exhaust system 22. As illustrated, the exhaust system 22 includes a muffler 24 (e.g., silencer) configured to direct exhaust gas out of the engine of the off-road vehicle 10. The muffler 24 is also configured to reduce a noise of the exhaust system 22. For example, the muffler 24 may be configured to reduce the magnitude of sound pressure oscillations created by the engine by damping the oscillations. In certain embodiments, the muffler 24 includes a selective catalytic reduction reactor (SCR) to remove certain emissions from the exhaust stream. As a result, in some embodiments, the muffler 24 may not be cylindrical. For example, the cross-section of the muffler 24 may be substantially D-shaped, elliptical, or the like. As illustrated, the muffler 24 is mounted so that a longitudinal axis of the muffler 24 extends in a substantially horizontal direction (e.g., substantially parallel to the ground). As illustrated, the muffler 24 is mounted proximate to a fender 26 of one front wheel 16. In the illustrated embodiment, a front end of the muffler 24 is angled downward relative to the surface of the ground. Furthermore, the muffler 24 is mounted forward of the cabin 14 (e.g., relative to a primary direction of travel), forward of the steering wheel 20, and adjacent to the body 12 of the off-road vehicle 10. Such a position and orientation of the muffler 24 may place the muffler 24 out of a line of sight of an operator within the cabin 14, thereby enhancing operator visibility.

In the illustrated embodiment, the exhaust system 22 also includes a diesel oxidation catalyst (DOC) 28. The DOC 28 is an exhaust after treatment system configured to oxidize hydrocarbons and carbon monoxide in the exhaust stream. In certain embodiments, diesel exhaust fluid may be injected downstream of the DOC 28 to facilitate further reactions in the SCR 24. As will be discussed below, the DOC 28 may be coupled directly to the muffler 24 or to a muffler mounting assembly 30. The muffler mounting assembly 30 is configured to receive and to support the muffler 24.

As shown in FIG. 1, the muffler mounting assembly 30 incorporates a cover 32 over the muffler 24 and the DOC 28. The cover 32 provides a barrier between the surfaces of the muffler 24 and the DOC 28 and the environment. In some embodiments, the cover 32 substantially wraps around the circumference of the muffler 24. However, in other embodiments, the cover 32 may partially cover the muffler 24. Furthermore, the cover 32 may fully or partially enclose the DOC 28. The cover 32 may be coupled to the muffler mounting assembly 30 and/or to the fender 26.

In the illustrated embodiment, a support bracket 34 is coupled to the muffler mounting assembly 30. In certain embodiments, the support bracket 34 abuts the fender 26 such that the bracket 34 appears to be a continuous extension of the fender 26. The support bracket 34 may be bolted, welded, or otherwise coupled to the muffler mounting assembly 30 and/or to the fender 26. For instance, the support bracket 34 may bolt to the muffler mounting assembly 30 and to the fender 26 to enable quick and easy removal of the support bracket 34 for cleaning and/or maintenance of the exhaust system 22. Moreover, in certain embodiments, the support bracket 34 may include passages and/or compartments that enable wiring, sensors, and the like to be coupled components of the exhaust system 22. For example, a passage within the support bracket 34 may provide thermal isolation for a wiring harness positioned proximate to the muffler 24 and/or the body 12.

Figure 2:
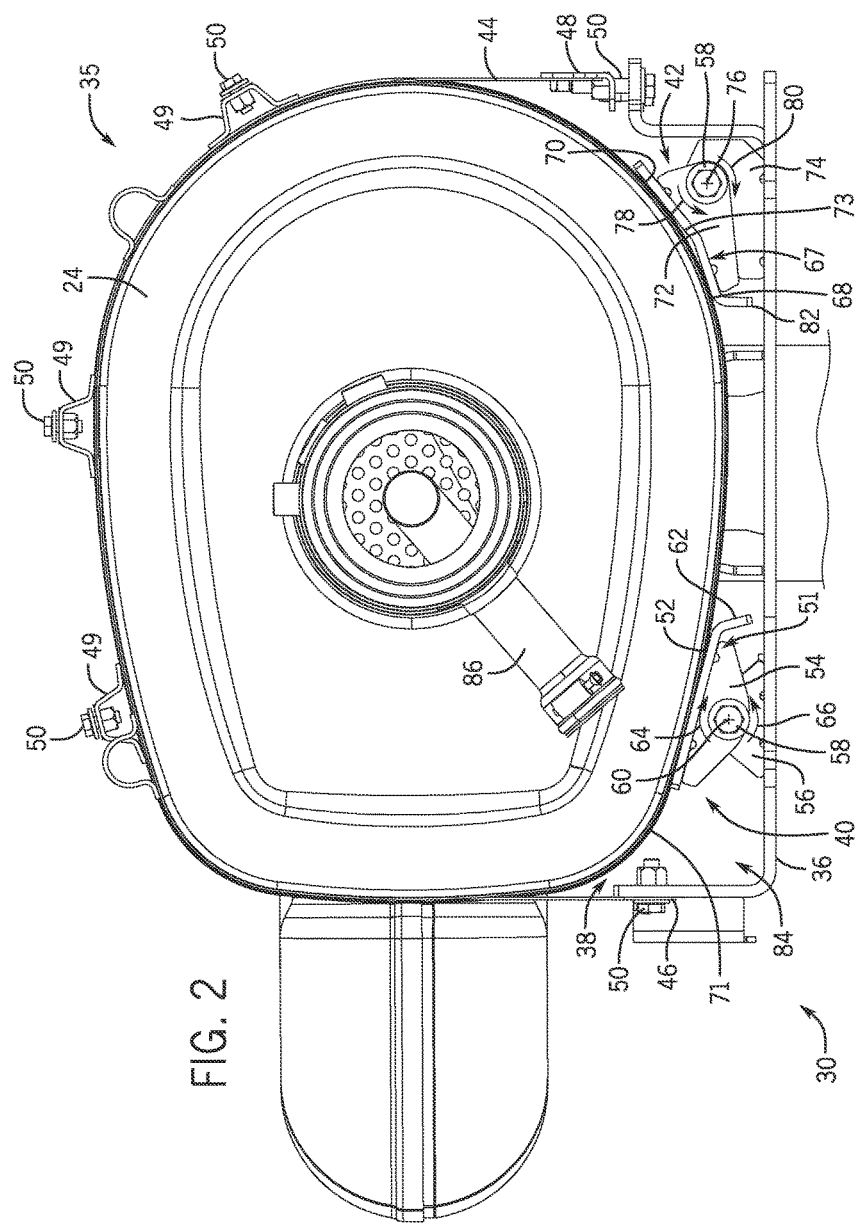
FIG. 2 is a front view of an embodiment of a horizontal muffler mounting assembly and a muffler that may be used in the off-road vehicle of FIG. 1.

FIG. 2 is a front view of an embodiment of the muffler mounting assembly 30 supporting the muffler 24 in a mounted position 35. The muffler mounting assembly 30 includes a cradle 36 having a recess 38. In the illustrated embodiment, the muffler 24 is supported within the cradle 36 by a first mounting pad assembly 40 and a second mounting pad assembly 42. The muffler mounting assembly 30 also includes straps 44, in the illustrated embodiment. The straps 44 are configured to couple to the cradle 36 at a first end 46 and a second end 48. The straps 44 apply a pressure to a portion of the periphery of the muffler 24 to secure the muffler 24 to the cradle 36. Moreover, the straps 44 include mounts 49 configured to enable coupling of the cover 32 to the muffler mounting assembly 30 using fasteners 50.

As mentioned above, the first mounting pad assembly 40 and the second mounting pad assembly 42 are configured to receive and to support the muffler 24 in the recess 38 of the cradle 36. As will be described in detail below, the first mounting pad assembly 40 and the second mounting pad assembly 42 are configured to adjust to conform to a surface of the muffler 24 to account for the shape of the muffler 24 and for manufacturing variances. In the illustrated embodiment, the first mounting pad assembly 40 is laterally offset from the second mounting pad assembly 42 relative to a longitudinal axis of the muffler 24 and includes a first mounting pad 51 having a generally flat first contact surface 52. However, in certain embodiments, the first contact surface 52 may be generally curved or shaped to conform to the muffler 24. As shown, the first contact surface 52 generally conforms to the muffler 24. In certain embodiments, the first mounting pad 51 is made of a hard, strong material, like steel or other metals. However, in other embodiments, the first mounting pad 51 may include a deformable and/or resilient material, such as a polymers, thermoplastics, or the like, that is configured to flex under the weight of the muffler 24. Flexibility of the first mounting pad 51 may provide improved support over rough or uneven terrain and may reduce the pressure applied to the muffler 24 by the first pad assembly 40.

The first mounting pad assembly 40 also includes a body 54 and a first support 56. The first body 54 is coupled to the first mounting pad 51. In certain embodiments, the first body 54 and the first mounting pad 51 may be an integrally formed piece. Although FIG. 2 shows a single first body 54 and first support 56, in certain embodiments there may be a multiple first bodies 54 and supports 56 distributed along the length of the first mounting pad 51. For instance, a first body 54 and a first support 56 may be disposed at each longitudinal end of the first mounting pad 51. Such positioning may decrease the number of holes (e.g., for fastening the first support 56 to the cradle 36 and/or for coupling the mounting assembly 30 to the off-road vehicle 10) in the cradle 36, thereby increasing the rigidity of the cradle 36. The first body 54 is rotatably coupled to the first support 56 via a rotation fastener 58. For example, in certain embodiments, the rotation fastener 58 may be a bolt that enables rotation of the first body 54 in a free state (e.g., untightened state) and blocks rotation of the first body 54 in a locked state (e.g., tightened state). That is, the bolt may be tightened by an operator to block rotation of the first body 54 about a first rotation axis 60, which extends through the longitudinal axis of the bolt. However, in alternative embodiments, additional fasteners may be included in the first mounting pad assembly 40 to block rotation of the first body 54. For example, there may be 1, 2, 3, 4, 5, 6, 7, 8, 9, 10, or more fasteners configured to block rotation of the first body 54 about the first rotation axis 60.

Furthermore, a first blocking member 62 is configured to block rotation of the first mounting pad 51 in a first direction 64 beyond a desired angle. As shown, the first blocking member 62 is configured to contact the cradle 36 to block over-rotation of the first mounting pad 51. That is, the first blocking member 62 orients the first mounting pad 51 in a desired position for supporting the muffler 54. It will be appreciated that a length of the first blocking member 62 may be particularly selected to control rotation of the first mounting pad 51 based on the muffler shape/size. Moreover, in other embodiments, the first blocking member 62 may also block rotation of the first mounting pad 51 in a second direction 66. Furthermore, in other embodiments, the blocking member 62 may be incorporated into the first support 56 and/or into the rotation fastener 58. For instance, the blocking member 62 may be a bearing that blocks rotation of the first body 54. Additionally, the blocking member 62 may be a spring configured to block rotation of the first body 54 past a desired angle. Furthermore, in certain embodiments, the first blocking member 62 may provide structural support to the first contact surface 52. As will be described in detail below, the first mounting pad 51 may extend along a substantial portion the length of the muffler 24 (e.g., 10%, 20%, 30%, 40%, 50%, or more). However, in other embodiments, the first mounting pad 51 may be divided into several longitudinally spaced segments along the length of the muffler 24.

In the illustrated embodiment, the second mounting pad assembly 42 includes a second mounting pad 67 having a second contact surface 68 and a third contact surface 70. The second mounting pad 67 is coupled to a second body 72. In certain embodiments, the second mounting pad 67 is integrally formed with the second body 72. As shown, the second and third contact surfaces 68, 70 are angularly offset. That is, a bend 73 separates the second contact surface 68 and the third contact surface 70. Because of the orientation of the second contact surface 68 and the third contact surface 70, the second mounting pad 67 conforms to mufflers 24 having a variety of shapes/contours. For example, in the illustrated embodiment, the muffler 24 has a substantially D-shaped cross-section. By utilizing the substantially flat first contact surface 52 with the second contact surface 68 and the third contact surface 70, three points of contact are established between the mounting pads 51, 67 and an outer surface 71 of the muffler 24, while the muffler 24 is secured in the mounted position 35. Furthermore, the three points of contact may be used to account for manufacturing variances in the muffler 24. Moreover, in certain embodiments, the second mounting pad 67 may include a deformable material (e.g., a polymer) for supporting the muffler 24.

The second body 72 of the second mounting pad assembly 42 is rotatably coupled to a second support 74. A second rotation axis 76 extends longitudinally through the rotation fastener 58. In certain embodiments, the rotation fastener 58 may be a bolt that enables rotation of the second body 72 in a free state (e.g., untightened state) and blocks rotation of the second body 72 in a locked state (e.g., tightened state). That is, the bolt may be tightened by an operator to block rotation of the second body 72 about a second rotation axis 76, which extends through the longitudinal axis of the bolt. However, in alternative embodiments, additional fasteners may be included in the second mounting pad assembly 42 to block rotation of the second body 72. For example, there may be 1, 2, 3, 4, 5, 6, 7, 8, 9, 10, or more fasteners configured to block rotation of the second body 72 about the second rotation axis 76. Accordingly, the second body 72 is configured to rotate about the second rotation axis in a third direction 78 and a fourth direction 80. Moreover, rotation of the second body 72 beyond a desired angle is block by a second blocking member 82. In the illustrated embodiment, the second blocking member 82 is configured to block rotation in the third direction 78. However, in other embodiments, the second blocking member 82 may also block rotation in the fourth direction 80. Furthermore, in certain embodiments, the second blocking member 82 may be incorporated into the second body 72 and/or into the rotation fastener 58. Additionally, in certain embodiments, the second blocking member 82 may provide structural support to the second contact surface 68 and/or the third contact surface 72. Moreover, as will be described below, the second mounting pad assembly 42 may extend along a substantial portion of the length of the muffler 24 along the longitudinal axis. However, in other embodiments, the second mounting pad assembly 42 may be separated into segments along the longitudinal axis of the muffler 24.

As shown, the cradle 36 includes a pathway 84 proximate to the first mounting pad assembly 40. In some embodiments, an aspiration tube 86 may be routed along the pathway 84. Containing the aspiration tube 86 within the cradle 36 reduces the footprint of the exhaust system. Moreover, as mentioned above, the cradle 36 may include passages and/or compartments for electrical components and sensors.

Figure 3:
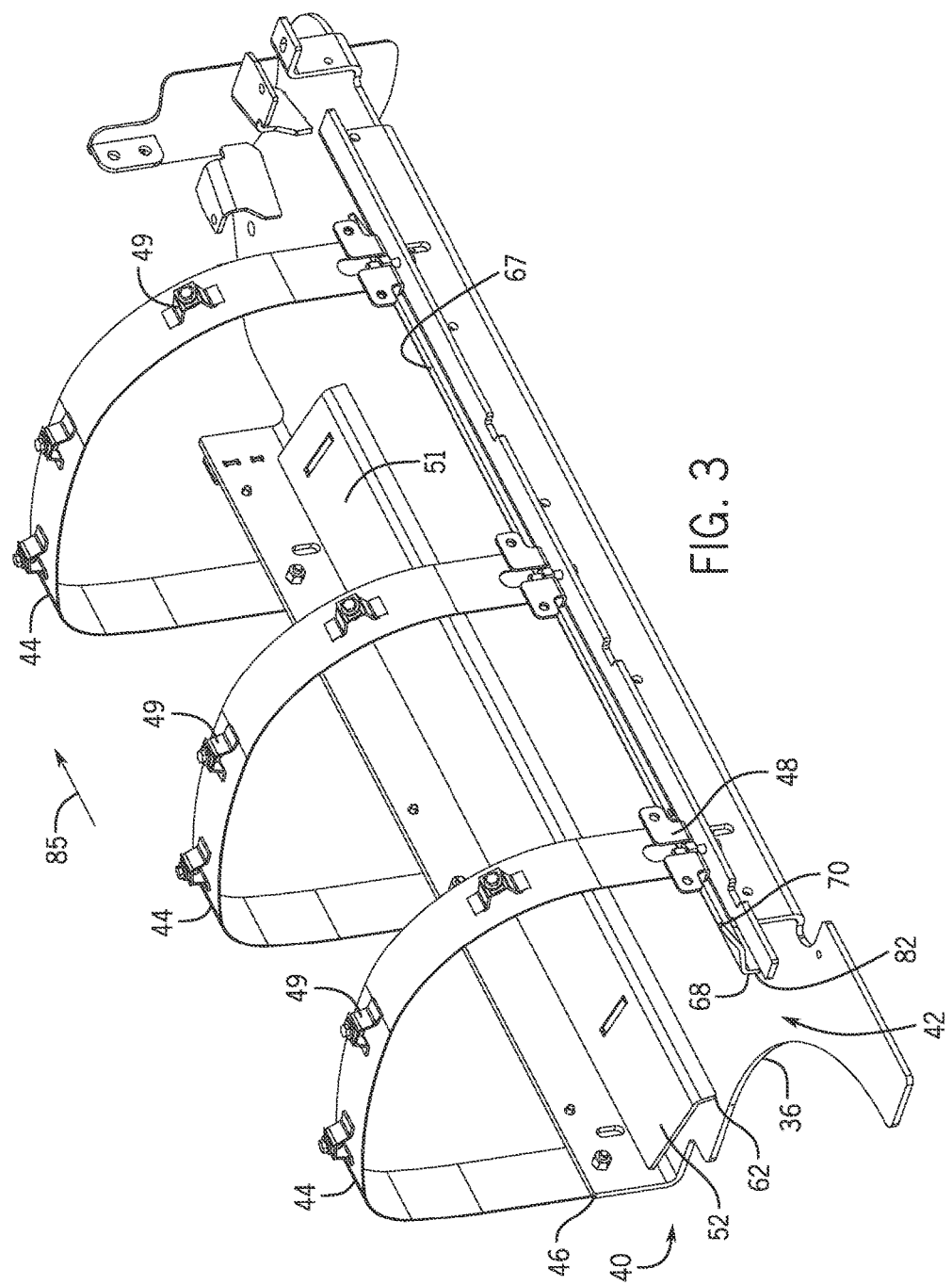
FIG. 3 is a perspective view of the horizontal muffler mounting assembly of FIG. 2.

FIG. 3 is a perspective view of the muffler mounting assembly 30, in which the muffler 24 and associated components have been removed for clarity. The cradle 36 extends along a substantial portion of the length of the muffler 24 (e.g., 30%, 40%, 50%, 60%, 70%, 80%, 90%, etc.) in a longitudinal direction 85 and includes the recess 38. As shown, the cradle 36 is configured to support the first mounting pad assembly 40 and the second mounting pad assembly 42. Moreover, the cradle 36 is configured to facilitate attachment of the muffler mounting assembly 30 to a frame of the off-road vehicle 10 proximate to the fender 26. Furthermore, in some embodiments, the cradle 36 may be configured to couple to the body 12 or to the DOC 28. In the illustrated embodiment, the cradle 36 is generally U-shaped, however, in other embodiments, the cradle 36 may be arranged in other configurations. For instance, the cradle 36 may be arranged as a substantially flat plate. As will be appreciated, the shape of the cradle 36 may be modified to account for the shape of the muffler 24 and/or the weight of the muffler 24, among other factors.

As mentioned above, the first mounting pad 51 extends along a substantial portion of the length of the muffler 24 (e.g., a substantial portion of the length of the cradle 36). However, in other embodiments, the first mounting pad 51 may be divided into longitudinal segments with spaces between the segments. For example, the first mounting pad 51 may be split into three segments spaced along the longitudinal direction 85. However, in other embodiments, there may be 2, 4, 5, 6, 7, 8, or any suitable number of segments. Similarly, the second mounting pad 67 also extends along the length of the cradle 36, in the illustrated embodiment. While the illustrated first and second mounting pads 51, 67 extend along a substantial portion of the length of the cradle 36, in other embodiments, the first and second mounting pads 51, 67 may extend along a partial length of the cradle 36. For example, in some embodiments, the first and second mounting pads 51, 67 may extend along approximately one-fourth, one-half, three-fourths, or any suitable portion of the length of the cradle 36 to account for the configuration of the muffler. For example, smaller mufflers 24 may use shorter first and second mounting pads 51, 67. The length of the mounting pads 51, 67 and the configuration of each mounting pad 51, 67 may be adjusted to account for various muffler configurations.

Furthermore, in the illustrated embodiment, the mounting assembly 30 includes three straps 44 approximately equally spaced along the longitudinal direction 85. However, in other embodiments, 1, 2, 4, 5, 6, or any suitable number of straps 44 may be used to secure the muffler 24 to the cradle 36. Moreover, the spacing of the straps 44 may correspond to features of the muffler 24. For example, the straps 44 may align with vertical baffles in the muffler 24 (e.g., the SCR). In such a configuration, the vertical baffles may provide additional rigidity to the muffler 24 to support the force applied to the muffler 24 by the straps 44.

Figure 4:
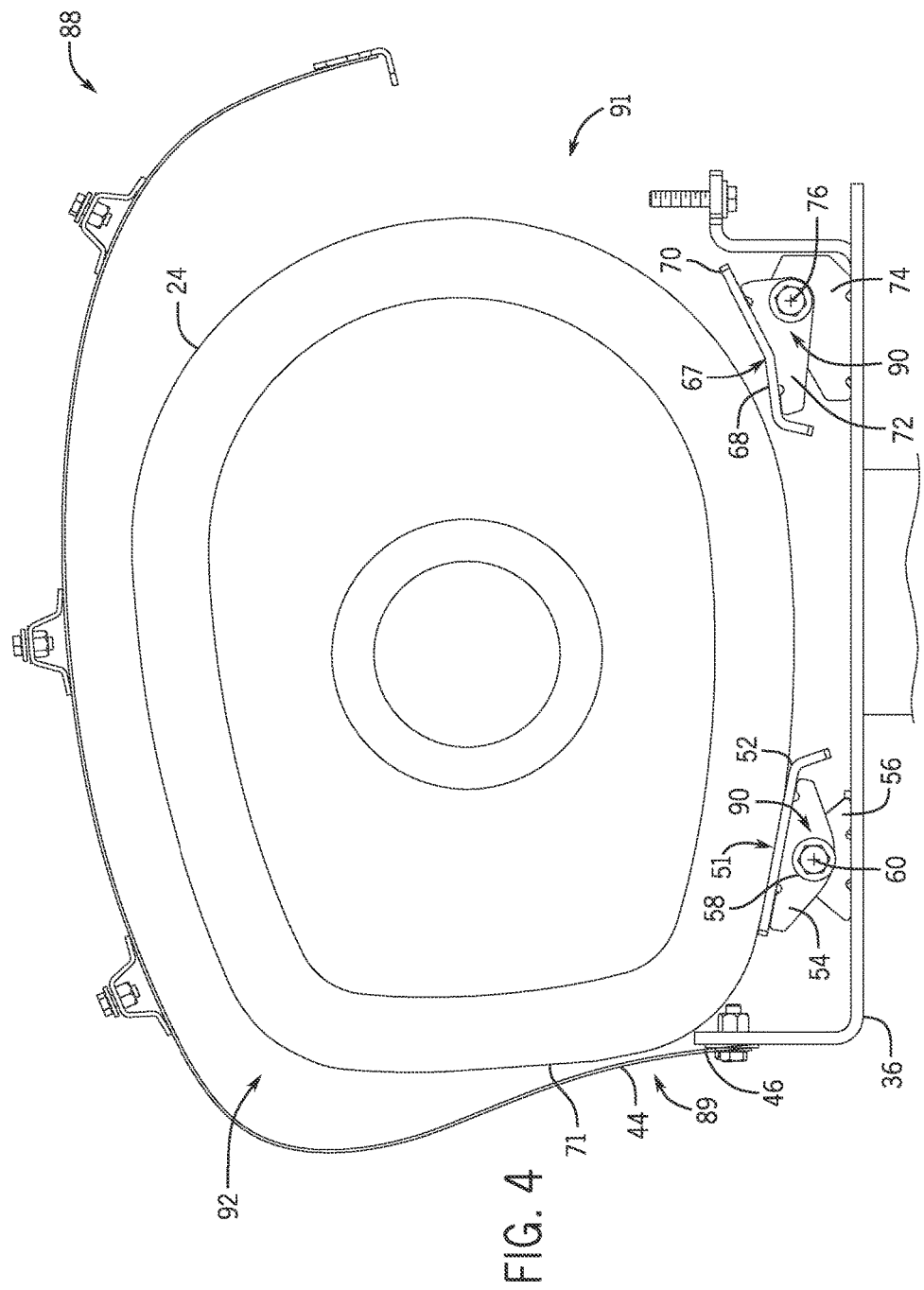
FIG. 4 is a front view the horizontal muffler mounting assembly of FIG. 2, in which the muffler is disposed in a first installation position.

FIGS. 4-7 illustrate an embodiment of a method of mounting the muffler 24 to the muffler mounting assembly 30. As will be described in detail below, the method corresponds to a progression in which the muffler 24 transitions from an unmounted position 88 to the mounted position 35. At the conclusion of the method, the muffler 24 is secured to the muffler mounting assembly 30 in the mounted position 35 and, therefore, is also secured to the off-road vehicle 10. Turning to FIG. 4, the muffler 24 is lowered into the muffler mounting assembly 30. As shown, the muffler 24 contacts the first contact surface 52 before contacting the second and third contact surfaces 68, 70. However, in other embodiments, the order in which the surfaces 52, 68, 70 are contacted may vary. Moreover, the straps 44 are not in contact with the muffler 24 at this stage of the installation. In the illustrated embodiment, the straps 44 are fastened to a first lateral side 89 of the cradle 36 at the first end 46. As described above, the rotation fastener 58 is in a free state 90, in which the first body 54 is free to rotate about the first rotation axis 60. That is, the rotation fastener 58 is not tightened, thereby enabling rotation of the first body 54 relative to the first support 56. As a result, an orientation of the first contact surface 52 adjusts to conform to the outer surface 71 of the muffler 24 (e.g., the first mounting pad 51 rotates about the first rotation axis 60 due to the weight of the muffler 24). Accordingly, installers may position the muffler 24 in the cradle 36 at a first position 92 and continue making adjustments to the positioning of the muffler 24 before completing the installation. As illustrated, the muffler 24 is not in contact with the second and third contact surfaces 68, 70 while in the first position 92. However, in certain embodiments, the muffler 24 may contact the second contact surface 68 and/or the third contact surface 70 while in the first position 92.

Figure 5:
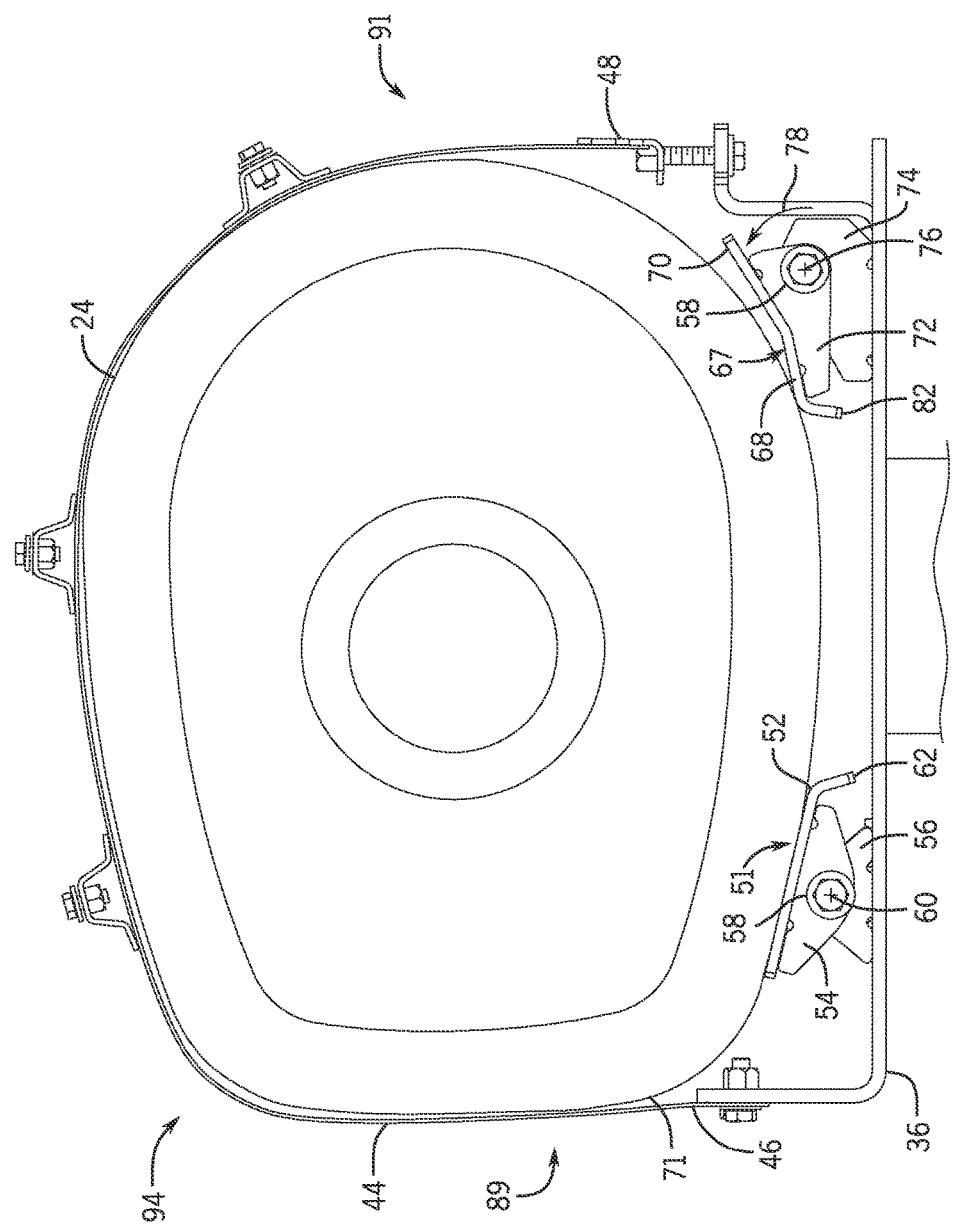
FIG. 5 is a front view of the horizontal muffler mounting assembly of FIG. 2, in which the muffler is disposed in a second installation position.

FIG. 5 is a front view of the muffler mounting assembly 30, in which the muffler 24 is in a second installation position 94. As illustrated, the muffler 24 is in contact with the first contact surface 52 and with the second contact surface 68. As mentioned above, the first and second bodies 54, 72 are configured to rotate about the respective rotation fasteners 58 while the fasteners 58 are in the free state 90. As a result, the first and second mounting pads 51 and 67 rotate about the first rotation axis 60 and the second rotation axis 76 as the muffler 24 is installed. For example, the second body 72 may rotate about the second rotation axis 76 in the third direction 78 to receive the muffler 24 as the muffler is installed in the muffler mounting assembly 30. In certain embodiments, the weight of the muffler 24 may drive the second blocking member 82 to contact the cradle 36. However, due to the position of the second blocking member 82, the second mounting pad assembly 42 maintains an orientation in which the second mounting pad 67 is capable of receiving the muffler 24. Also, the first body 54 may rotate in the first direction 64 to facilitate contact between the second contact surface 68 and the outer surface 71 of the muffler 24 as the muffler 24 is being lowered into position. Furthermore, as shown in the illustrated embodiment, the straps 44 are looped around the muffler 24, and the second end 48 is coupled to the cradle 36 at a second lateral side 91 of the muffler 24. However, the straps 44 are not tightened because the muffler 24 is not yet in the mounted position 35.

Figure 6:
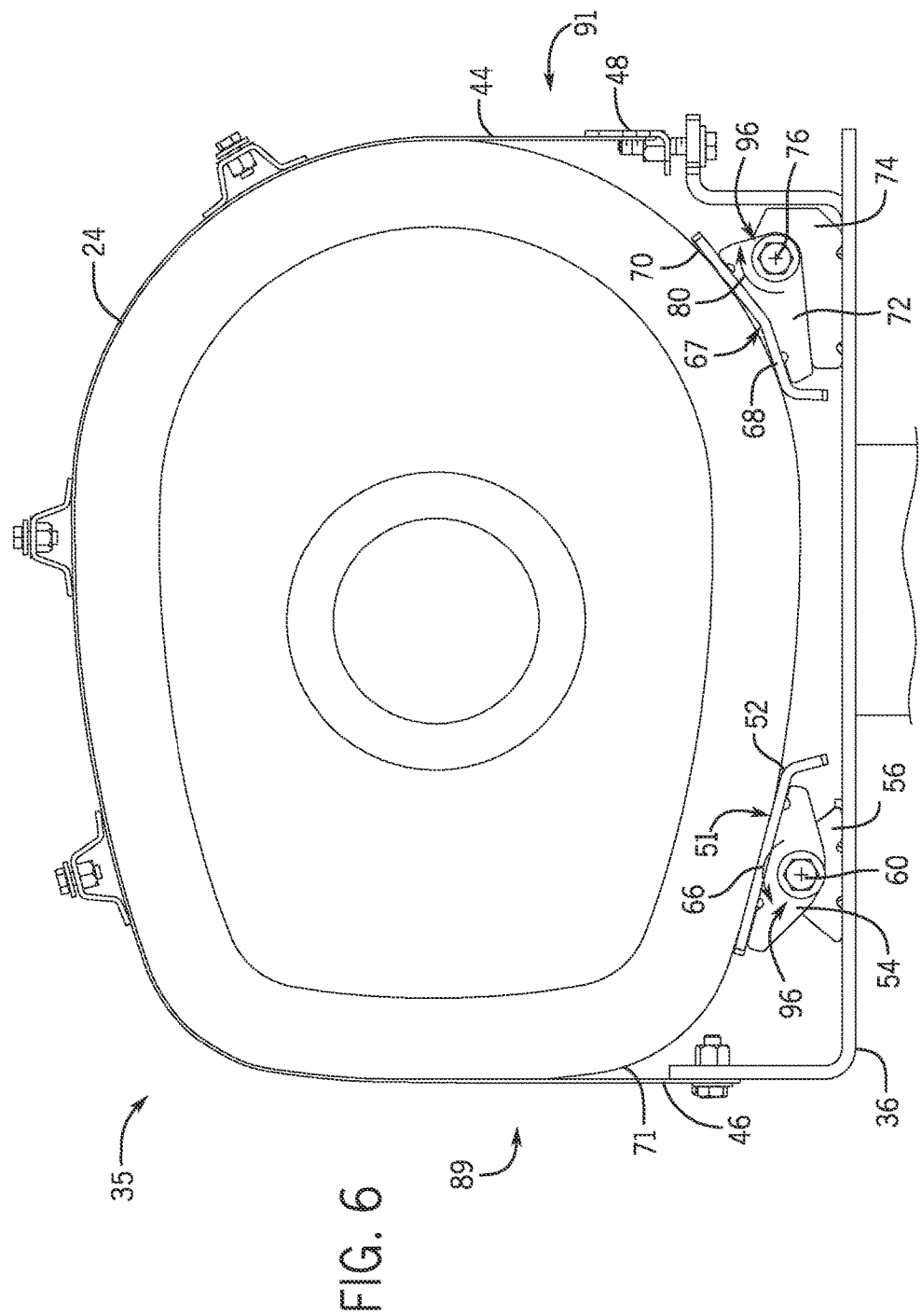
FIG. 6 is a front view of the horizontal muffler mounting assembly of FIG. 2, in which the muffler is disposed in a mounted position.

FIG. 6 is a front view of the muffler mounting assembly 30, in which the muffler 24 is in the mounted position 35. As shown, the muffler 24 is in three-point contact with the mounting pads 51, 67. That is, the muffler 24 is in contact with the first contact surface 52, the second contact surface 68, and the third contact surface 70. The second body 72 may rotate about the second rotation axis 76 in the fourth direction 80 to receive the muffler 24. Moreover, the first body 54 may rotate about the first rotation axis 60 in the second direction 66 as a portion of the weight of the muffler 24 is transferred to the third contact surface 70. As a result, the muffler is in the illustrated mounted position 35.

While in the mounted position 35, the installer may tighten the straps 44 to further secure the muffler 24 to the muffler mounting assembly 30. For example, the installer may rotate the fasteners 50 coupling the straps 44 to the cradle 36 to increase the tension in the strap 44. As the straps are tightened, the muffler 24 may shift (e.g., via rotation of the first and second bodies 54, 72), thereby further aligning the muffler 24 on the first and second mounting pads 51, 67. After the straps 44 are secured, the operator may transition the rotation fasteners 58 to a locked state 96. That is, the rotation fasteners 58 are configured to block rotation of the first and second bodies 54, 72 about the first and second rotation axes 60, 76 while in the locked state 96. Accordingly, the muffler 24 is secured to the muffler mounting assembly 30. To that end, the muffler 24 is installed with reduced involvement of the installers because the first and second mounting pads 51, 67 automatically adjust to conform to the shape of the muffler 24 and obtain three points of contact between the muffler 24 and the first and second mounting pads 51, 67.

Figure 7:
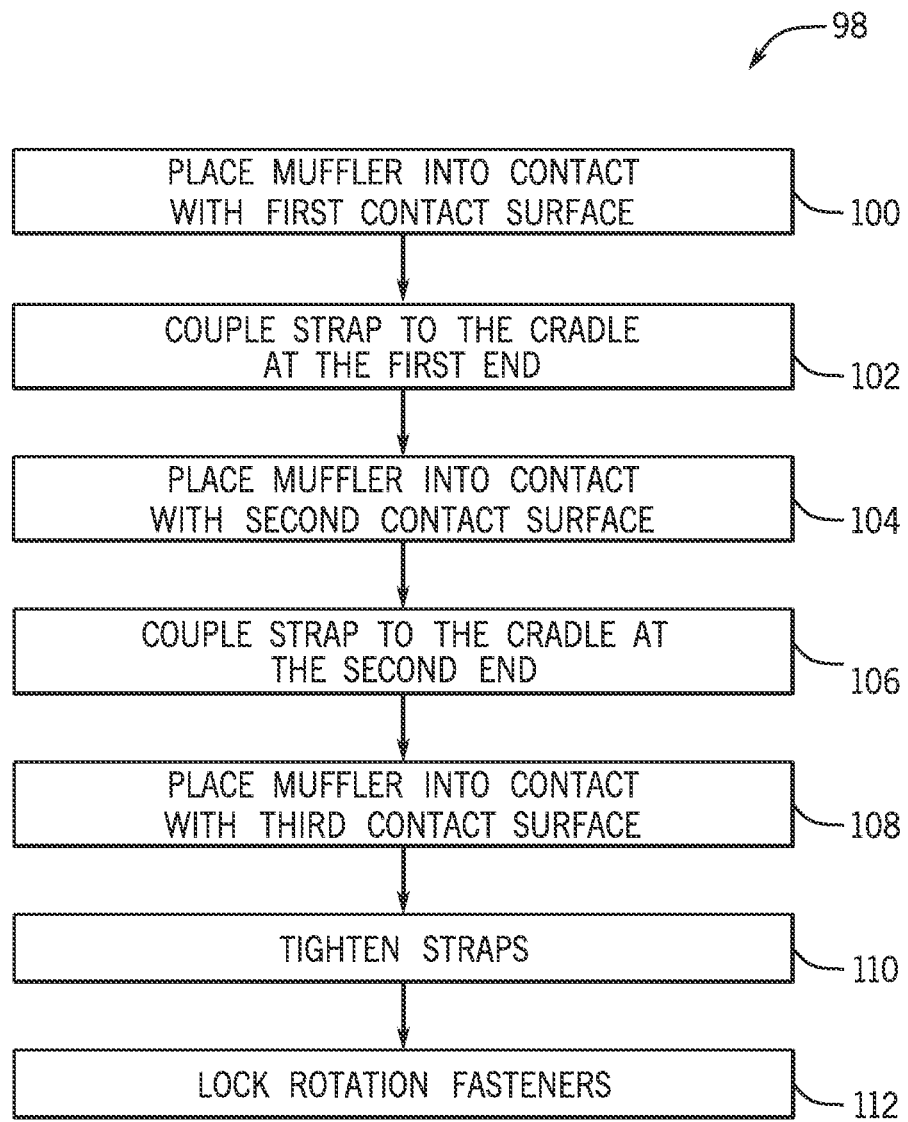
FIG. 7 is a flow chart of an embodiment of a method for securing a muffler to a horizontal muffler mounting assembly.

FIG. 7 is a flow chart of an embodiment of a method 98 for securing the muffler 24 to the muffler mounting assembly 30. The muffler 24 is placed into contact with the first contact surface 52 at block 100. For example, the muffler 24 may be lowered into the recess 38 of the cradle 36 such that the outer surface 71 of the muffler 24 contacts the first contact surface 52, thereby positioning the muffler 24 in the first installation position 92. Moreover, as mentioned above, the muffler 24 may not contact the second and third contact surfaces 68, 70 while in the first position 92. The straps 44 are coupled at the first end 46 to the cradle 36 on a first lateral side 89 of the muffler 24 at block 102. For example, the straps 44 may be coupled to the cradle 36, but not positioned in contact with the outer surface 71 of the muffler 24.

The outer surface 71 of the muffler 24 is placed into contact with the second contact surface 68 at block 104. That is, the muffler 24 is transitioned to the second installation position 94 from the first installation position 92. For example, the first body 54 may rotate in the first direction 64 about the first rotation axis 60 as the outer surface 71 of the muffler 24 is shifted toward the second mounting pad 51. Additionally, the second body 72 may rotate in the third direction 78 about the second rotation axis 76 to move the second mounting pad 67 into a position to receive the muffler 24. The straps 44 are coupled at the second end 48 to the cradle 36 at the second lateral side 91 of the muffler 24 at block 106. As mentioned above, the straps 44 may be looped around the muffler 24 while the muffler 24 is in the second installation position 94, but not tightened. In certain embodiments, the straps 44 contact the muffler 24, however, in other embodiments, the straps 44 are loosely looped around and not in contact with the muffler 24.

The muffler 24 is moved into contact with the third contact surface 70 at block 108. That is, the muffler 24 is transitioned to the mounted position 35. As described above, the second body 72 may rotate about the second rotation axis 76 to receive the muffler 24 and place the muffler 24 in contact with the third contact surface 70. The straps 44 are tightened to secure the muffler 24 to the muffler mounting assembly 30 at block 110. The straps 44 are configured to apply force to the outer surface 71 of the muffler 24 to maintain the muffler 24 in the mounted position 35. Moreover, as described above, the muffler 24 may adjust (e.g., facilitation rotation of the first and second mounting pads 51, 67) as the straps 44 are tightened. In certain embodiments, the rotation fasteners 58 are transitioned from a free state 90 to a locked state 96 at block 112. By moving the rotation fasteners 58 to the locked state 96, rotation about the first rotation axis 60 and the second rotation axis 76 is blocked. As a result, the muffler 24 is secured to the muffler mounting assembly 30.

As described in detail above, the muffler mounting assembly 30 is configured to secure the muffler 24 to the frame and/or fender 26 of the off-road vehicle 10 and to automatically adjust to the shape of the muffler 24. For example, the muffler mounting assembly 30 includes the first mounting pad assembly 40 and the second mounting pad assembly 42 to support the muffler 24. The first mounting pad assembly 40 includes the first mounting pad 51 coupled to the first body 54. The first body 54 is configured to rotate about the first rotation axis 60 relative to the first support 56. The second mounting pad includes second and third contact surfaces 68, 70 coupled to the second body 72 configured to rotate about the second rotation axis 76 relative to the second support 74. As a result, the first and second mounting pad assemblies 40, 42 can adjust the position of the respective contact surfaces 52, 68, 70 to receive the muffler 24. To that end, the rotation fasteners 58 of the first and second mounting pad assemblies 40, 42 are configured to lock the rotation of the first and second mounting pads 51, 67 while the muffler 24 is in the mounted position 35. Furthermore, the straps 44 are configured to further secure the muffler 24 to the muffler mounting assembly 30. Accordingly, as described above, a self-adjusting muffler mounting assembly 30 secures the muffler 24 to the frame and/or fender 26 of the off-road vehicle 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A mounting assembly for a muffler of an off-road vehicle, comprising:
   a first mounting pad rotatably coupled to a first support, wherein the first mounting pad is configured to rotate in a first direction and in a second direction, opposite the first direction, about a first rotation axis; and
   a second mounting pad rotatably coupled to a second support, wherein the second mounting pad is configured to rotate in the first direction and in the second direction about a second rotation axis;
   wherein the first and second mounting pads are laterally offset from one another relative to a longitudinal axis of the muffler, the first and second mounting pads are configured to support the muffler, and the first and second mounting pads are configured to independently rotate relative to the respective supports about the respective rotation axes,
   wherein the first and second supports are coupled to a cradle and the cradle is configured to support the first and second supports, and wherein the first mounting pad comprises a first blocking member, the second mounting pad comprises a second blocking member, or a combination thereof, wherein each blocking member is configured to block rotation of the respective mounting pad about the respective rotation axis via contact with the cradle.

2. The mounting assembly of claim 1, comprising at least one strap having a first end and a second end, wherein the first end is coupled to the cradle on a first lateral side of the muffler and the second end is coupled to the cradle on a second lateral side of the muffler, opposite the first side, and the at least one strap extends along a vertical side of the muffler, opposite the first and second mounting pads, to secure the muffler to the cradle.

3. The mounting assembly of claim 1, wherein the first mounting pad is configured to contact a surface of the muffler at at least one point, and the second mounting pad is configured to contact the surface of the muffler at at least two points, while the muffler is mounted to the cradle.

4. The mounting assembly of claim 1, where the first and second mounting pads extend along more than 50 percent of a length of the muffler along the longitudinal axis.

5. A mounting assembly for a muffler of an off-road vehicle, comprising:
a cradle configured to receive the muffler, and to couple to a frame of the off-road vehicle;
a first mounting pad assembly coupled to the cradle, wherein the first mounting pad assembly comprises:
a first support mounted on a support surface of the cradle;
a first body rotatably coupled to the first support, wherein the first body is configured to rotate about a first rotation axis; and
a first mounting pad coupled to the first body, wherein the first mounting pad is configured to contact an outer surface of the muffler to support the muffler within the mounting assembly; and
a second mounting pad assembly coupled to the cradle and laterally offset from the first mounting pad assembly relative to a longitudinal axis of the muffler, wherein the second mounting pad assembly comprises:
a second support mounted on the support surface of the cradle;
a second body rotatably coupled to the second support, wherein the second body is configured to rotate about a second rotation axis; and
a second mounting pad coupled to the second body, wherein the second mounting pad is bent to contact the outer surface of the muffler at two points to support the muffler within the mounting assembly,
wherein each of the first mounting pad assembly and the second mounting pad assembly includes a rotation fastener configured to facilitate rotation of the respective body while in a free state to block rotation of the respective body while in a locked state.

6. The mounting assembly of claim 5, comprising at least one strap having a first end and a second end, wherein the first end is coupled to the cradle on a first lateral side of the muffler and the second end is coupled to the cradle on a second lateral side of the muffler, opposite the first side, and the at least one strap extends along a vertical side of the muffler, opposite the first and second mounting pad assemblies, to secure the muffler to the cradle.

7. The mounting assembly of claim 5, where the first and second mounting pads extend along more than 50 percent of a length of the muffler along the longitudinal axis.

8. The mounting assembly of claim 5, comprising a plurality of first and second mounting pad assemblies disposed along the longitudinal axis of the muffler, wherein the first mounting pad assembly of the plurality of first mounting pad assemblies are longitudinally offset from one another such that each first mounting pad of the plurality of first mounting pad assemblies is configured to contact the outer surface of the muffler, and wherein the second mounting pad assembly of the plurality of second mounting pad assemblies are longitudinally offset from one another such that each second mounting pad of the plurality of second mounting pad assemblies is configured to contact the outer surface of the muffler.

9. The mounting assembly of claim 5, wherein the first mounting pad is configured to contact the outer surface of the muffler at at least one point, and the second mounting pad is configured to contact the outer surface of the muffler at at least two points, while the muffler is mounted to the mounting assembly.

10. A mounting assembly for a muffler of an off-road vehicle, comprising:
a cradle configured to receive the muffler, and to couple to a frame of the off-road vehicle;
a first mounting pad assembly coupled to the cradle, wherein the first mounting pad assembly comprises:
a first support mounted on a support surface of the cradle;
a first body rotatably coupled to the first support, wherein the first body is configured to rotate about a first rotation axis; and
a first mounting pad coupled to the first body, wherein the first mounting pad is configured to contact an outer surface of the muffler to support the muffler within the mounting assembly; and
a second mounting pad assembly coupled to the cradle and laterally offset from the first mounting pad assembly relative to a longitudinal axis of the muffler, wherein the second mounting pad assembly comprises:
a second support mounted on the support surface of the cradle;
a second body rotatably coupled to the second support, wherein the second body is configured to rotate about a second rotation axis; and
a second mounting pad coupled to the second body, wherein the second mounting pad is bent to contact the outer surface of the muffler at two points to support the muffler within the mounting assembly,
wherein the first mounting pad comprises a first blocking member, the second mounting pad comprises a second blocking member, or a combination thereof, wherein each blocking member is configured to block rotation of the respective body about the respective rotation axis.

11. The mounting assembly of claim 10, wherein each of the first and second blocking members is configured to block rotation of the respective body about the respective rotation axis via contact with the cradle.

* * * * *